(12) United States Patent
Martinez et al.

(10) Patent No.: US 10,569,798 B2
(45) Date of Patent: Feb. 25, 2020

(54) LINKAGE FOR STEERING WHEEL ELECTRIC MOTOR TILT ASSEMBLY

(71) Applicant: NSK Americas, Inc., Ann Arbor, MI (US)

(72) Inventors: Victor Corona Martinez, Ann Arbor, MI (US); David Ray Hartman, Brighton, MI (US); Logananth Chinniah, Ypsilanti, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 142 days.

(21) Appl. No.: 15/764,487

(22) PCT Filed: Oct. 3, 2016

(86) PCT No.: PCT/US2016/055156
§ 371 (c)(1),
(2) Date: Mar. 29, 2018

(87) PCT Pub. No.: WO2017/059422
PCT Pub. Date: Apr. 6, 2017

(65) Prior Publication Data
US 2018/0273080 A1 Sep. 27, 2018

Related U.S. Application Data

(60) Provisional application No. 62/235,646, filed on Oct. 1, 2015.

(51) Int. Cl.
*B62D 1/18* (2006.01)
*B62D 1/181* (2006.01)
(Continued)

(52) U.S. Cl.
CPC .............. *B62D 1/181* (2013.01); *B62D 1/189* (2013.01); *F16H 25/20* (2013.01); *F16H 2025/2043* (2013.01)

(58) Field of Classification Search
CPC ........ B62D 1/181; B62D 1/189; B62D 1/184; B62D 1/16; B62D 1/20; F16H 2025/2043
See application file for complete search history.

(56) References Cited

U.S. PATENT DOCUMENTS

| 4,925,210 A | 5/1990 | Peitsmeier et al. |
| 2002/0079685 A1* | 6/2002 | Yoshimoto ............. B62D 1/181 280/775 |

(Continued)

FOREIGN PATENT DOCUMENTS

| DE | 3737225 C1 | 1/1989 |
| DE | 102008054310 A1 | 6/2010 |

(Continued)

OTHER PUBLICATIONS

International Search Report and Written Opinion for International Application PCT/US2016/055156, dated Dec. 14, 2016.

*Primary Examiner* — Zakaria Elahmadi
(74) *Attorney, Agent, or Firm* — The Dobrusin Law Firm, P.C.

(57) ABSTRACT

A steering column assembly (10) including a mounting structure (20); a column housing (50) having a wall opening (54) and being fixed in position for upward and downward pivotal motion; a tilt screw (72) having a threaded shank and a gear; a tilt nut (80) and optionally a bushing surrounding the tilt nut positioned at least partially within and contacting a surface defining wall opening (54) and having a threaded bore adapted to receive the tilt screw, the contact between the tilt nut and the wall opening such that the load transmitted from the wall opening to the tilt nut is substantially on axis with the threaded bore; a motor (96) for raising and lowering the column housing by rotating the gear portion and causing the tilt nut to advance toward or away from the gear, causing the column housing to raise or lower, and (Continued)

wherein the longitudinal axis of the threaded shank can pivot fore or aft as the column housing is raised or lowered.

20 Claims, 5 Drawing Sheets

(51) Int. Cl.
    *B62D 1/189*     (2006.01)
    *F16H 25/20*     (2006.01)

(56) References Cited

U.S. PATENT DOCUMENTS

| | | | | |
|---|---|---|---|---|
| 2007/0170711 A1* | 7/2007 | Bechtel | ............... | B62D 1/184 280/775 |
| 2008/0216597 A1* | 9/2008 | Iwakawa | ............... | B62D 1/181 74/493 |
| 2008/0229867 A1* | 9/2008 | Waibel | ............... | B62D 1/184 74/493 |
| 2009/0064814 A1* | 3/2009 | Tanaka | ............... | B62D 1/181 74/493 |
| 2011/0115206 A1* | 5/2011 | Sulser | ............... | B62D 1/184 280/775 |
| 2012/0144953 A1* | 6/2012 | Schnitzer | ............... | B62D 1/184 74/493 |
| 2013/0110353 A1* | 5/2013 | Tanaka | ............... | B62D 1/181 701/44 |
| 2013/0305871 A1* | 11/2013 | Ohara | ............... | B62D 1/187 74/493 |
| 2015/0069745 A1* | 3/2015 | Iwakawa | ............... | B62D 1/181 280/775 |
| 2015/0096404 A1* | 4/2015 | Martinez | ............... | B62D 1/195 74/492 |
| 2016/0252133 A1* | 9/2016 | Caverly | ............... | F16C 29/02 74/493 |

FOREIGN PATENT DOCUMENTS

| | | |
|---|---|---|
| EP | 1880917 A1 | 1/2008 |
| EP | 2586677 A2 | 5/2013 |
| EP | 2724915 A1 | 4/2014 |
| JP | H02-68265 U | 5/1990 |
| JP | 2002-002503 A | 1/2002 |

* cited by examiner

LINKAGE FOR STEERING WHEEL ELECTRIC MOTOR TILT ASSEMBLY

FIELD

In general, the present teachings relate to an improved steering column assembly and methods associated with the same. More particularly, the present teachings pertain to an assembly and method for providing an adjustable tilt function to a steering wheel in relation to a vehicle operator (e.g., raising and lowering).

BACKGROUND

In the field of automotive vehicles, it has become popular to employ steering column assemblies that include tilt and/or telescoping functions, such assemblies being known also as "rake and reach steering column assemblies." For assemblies that have an adjustable tilt or rake function, it is common to use a motor, and particularly an electric motor. For example, it is common to employ an electric motor that rotates a shaft for actuating a steering column assembly. It is also possible to employ one or more levers for manual performance of one or both of these functions. However, within steering column assemblies, there is limited space for which to incorporate the elements that enable the adjustment of the steering wheel by providing tilt and/or telescoping functions. Notwithstanding recent efforts in the area, there remains a need for packaging motors and steering column assemblies within a small footprint in a vehicle. Moreover, there remains a need to reduce manufacturing costs and create lightweight vehicle systems, including steering column assemblies.

Existing technologies may include employing a tilt screw associated with and/or driven by a motor. As the steering shaft raises and lowers, as a result of the tilt subassembly, a great deal of stress is placed upon the tilt screw.

One approach to provide a tilt function previously has been to employ a tilt screw that is generally aligned perpendicular with an axis of rotation of a motor for driving the screw. The screw has been assembled through a threaded nut or brass fitting. Upon completing the assembly, an adjustment screw would be inserted into the nut with an appropriate amount of torque applied to adjust clearance of the threads of the nut or brass fitting and the threads of the screw through the entire, distance of travel of the column housing.

Notwithstanding efforts to improve steering column assemblies (e.g., steering column assemblies having adjustable tilt functions), there remains a need for alternative assemblies, particularly those in which fewer parts are required within the assembly, less stess is placed on the tilt screw, or both.

SUMMARY

The present teachings make use of a simple, yet elegant, construction approach by which relatively few components can be employed for achieving an adjustable steering column assembly, such as a steering column assembly able to effectively perform an adjustment of the steering column by having a tilt function, a telescoping function, or both.

In a very general sense, the teachings herein relate to an improved assembly by which a motor operates to actuate an elongated actuatable member having a longitudinal axis (e.g., to rotate a tilt screw that is rotatable about its longitudinal axis). The elongated actuatable member (e.g., the tilt screw) is engaged with a position securing member that at least partially surrounds the elongated actuatable member (e.g., the tilt screw is threadingly engaged with a nut and an optional bushing) and is pivotally carried within a column housing. As the elongated actuatable member is actuated by the motor (e.g., the tilt screw rotates), the position securing member (e.g., the tilt nut and optional bushing) moves along the elongated actuatable member (e.g., the tilt screw), pivots relative with the column housing, and causes the column housing to be raised or lowered (it will be appreciated that the column housing may be pivotally fixed to a mounting bracket at a location along the mounting bracket). As will be demonstrated, it may be possible to maintain a load transmitted from the column housing so it is substantially on axis with the longitudinal axis of the elongated actuatable member (e.g., the tilt screw), which may also be substantially on axis with a through bore of the position securing member (e.g., it may also be substantially on axis with a threaded bore of the tilt nut).

The teachings generally contemplate a steering column assembly that includes an inner column tube, a steering shaft (adapted for coupling with a steering wheel or other like structure) that is supported for rotation at least in part by the inner column tube and having a longitudinal axis; and a suitable bracket for carrying the inner column tube and attaching the assembly within a vehicle (e.g., to a cross-vehicle structure, an instrument panel assembly, the like, or a combination thereof). The bracket, such as a steering column mounting structure, may be coupled with a column housing, such as for securing the column housing in a generally fixed position within the vehicle. A tilt subassembly may be employed for selectively raising and/or lowering the steering shaft (e.g., so that the height position of the steering wheel relative to a vehicle operator can be adjusted). The column housing may be pivotally coupled to the steering column mounting structure to permit steering shaft tilt adjustment by way of the tilt subassembly. The inner column tube may be configured to be carried by the column housing (e.g., in a telescoping manner), in one or more fixed positions. For example, the inner column tube may be telescopically adjustable (e.g., by way of a manual adjustment lever or a motor) within and/or relative to the column housing. The column housing and the inner column tube each will have a longitudinal axis. Their respective longitudinal axes may be generally aligned (e.g., they may be generally co-axial).

The present teachings may include an adjustable rake steering column assembly having a steering column mounting structure. The steering column mounting structure, may include an upper portion adapted to be fixedly secured within an automotive vehicle (e.g., to a cross-vehicle member). The steering column assembly may include a column housing. The column housing may have a longitudinal axis. The column housing may be adapted to carry, an inner column tube having a steering shaft at least partially disposed therein. The column housing may include a wall having an opening therein (i.e., a column housing wall opening). The column housing wall opening may be located transversely of the longitudinal axis of the column housing. The column housing may be fixed in position along its length for affording a generally upward and downward pivotal motion in relation to the steering column mounting structure. The steering column mounting structure may include a forward portion having generally opposing downwardly disposed side walls (e.g., connecting walls) for pivotally securing the column housing to the steering column mounting structure. The steering column mounting structure may include generally opposing downwardly disposed side walls (e.g., forming a collar portion), at least one of which may have an opening that is generally juxtaposed with the column housing wall opening.

The adjustable steering column assembly may further include an elongated actuatable member, such as a tilt screw, having a longitudinal axis. The tilt screw may have a threaded shank portion. The tilt screw (or another elongated actuatable member) may include an engagement element that is adapted to connect to and/or engage with at least a portion of the motor or other actuator that assists in the raising and lowering of the column housing. The engagement element may include one or more gear portions, one or more internal openings or cavities (e.g., a hex, square, or other polygonal shape) for receiving a portion of a drive shaft, one or more projections to be received by a portion of the drive shaft, or a combination thereof. The upper portion of the steering column mounting structure may have an opening defined therein through which the tilt screw can accessed. The longitudinal axis of the tilt screw may be non-parallel relative to the longitudinal axis of the upper portion, but may be pivotable over a range of about ±10°. The column housing wall opening and the tilt screw may be located transversely of the longitudinal axis of the column housing on a single side only of the column housing.

The adjustable steering column assembly may further include a position securing member, such as a tilt nut and an optional bushing located at least partially around the tilt nut (e.g., around one or more of the side walls of the tilt nut). The tilt nut may have a threaded bore therethrough adapted to receive the tilt screw in threaded engagement. The optional bushing may also include openings adapted to receive the tilt screw. The tilt nut may be positioned at least partially within the column housing wall opening. The tilt nut may have a body with an outer surface that is in contact with a surface defining the column housing wall opening. The body of the tilt nut may be in contact with an inner surface of the bushing. The bushing may then be in contact with a surface defining the column housing wall opening. The contact arranged between the tilt nut and the column housing wall opening may be such that the load transmitted from the column housing wall opening to the tilt nut is substantially on axis with the threaded bore. The column housing wall opening and the tilt nut may be configured to provide line contact between the body of the tilt nut and the surface of the column housing defining the column housing wall opening, thereby resisting lash in a generally vertical direction while still allowing the column housing to rotate freely among different rake positions throughout a full range of operative movement. The contact arranged between the bushing and the column housing may be line contact or planar contact. As a result of the outer surface of the tilt nut body contacting the surface of the wall opening or contacting the bushing, the longitudinal axis of the threaded shank portion of the tilt screw may be able to pivot (e.g., fore or aft) generally relative to the column housing as the column housing is raised or lowered. The column housing wall opening may have a maximum height and a maximum width, and the tilt nut may have a maximum height and a maximum width. The bushing may have a maximum height and a maximum width. At least the maximum width of the column housing wall opening may exceed the maximum width of the tilt nut, maximum width of the bushing, or both. The maximum height of the column housing wall opening may approximate the maximum height of the tilt nut, maximum height of the bushing, or both. The tilt nut may have a generally flat front wall. The tilt nut may have a generally opposing flat rear wall. The tilt nut may have a side wall having rounded portions (e.g., corners, such as for defining a generally race track shape), which connects the front wall with the rear wall. The tilt nut may have side walls including one or more ribs (which may provide a surface that is generally planar or generally rounded). The side walls of the tilt nut may be adapted to contact the bushing surrounding the nut. The threaded bore may have a longitudinal axis that intersects the sidewall and is approximately parallel with the front wall and the rear wall. The tilt nut may be fabricated from a polymeric material (e.g., a crystalline polymer, such as an acetal homopolymer (e.g., Delrin®)). The tilt nut may be free of any adjustment screw for resisting lash. The tilt nut may be free of any structure (e.g., any metallic structure) into which the tilt nut is press fit.

The steering column assembly may include at least one motor adapted for raising and lowering the column housing. The motor may be configured to operatively rotate the gear portion of the tilt screw and cause the tilt nut to advance toward the gear portion or withdraw away from the gear portion. When the tilt nut advances toward the gear portion or withdraws away from the gear portion, the position of the tilt nut within the column housing may cause the column housing to raise or lower relative to the mounting structure. The at least one motor may have an externally projecting elongated drive shaft (e.g., a threaded drive shaft). The drive shaft may have a longitudinal axis oriented generally parallel with the longitudinal axis of the column housing. The drive shaft may have a longitudinal axis oriented generally perpendicular relative to the longitudinal axis of the tilt screw. The drive shaft may engage the gear portion of the tilt screw for rotating the tilt screw. The rotation of the tilt screw may cause the tilt nut to move along the tilt screw (e.g., upwardly or downwardly) to thereby raise and lower the column housing relative to the mounting structure. The steering column assembly may also include a telescoping subassembly adapted to selectively advance the inner column tube, steering shaft or both in a fore or aft direction.

The present teachings also contemplate methods of assembling and adjustable steering column assembly. The methods may include a step of threading the tilt screw through the tilt nut; orienting the tilt screw so that its longitudinal axis is positioned generally vertically within the assembly; and locating the tilt nut within the column housing wall opening so that generally opposing portions of the tilt nut are in direct contact with the wall structure defining the column housing wall opening. These steps may be performed in any order. The step of locating the tilt nut within the column housing wall opening so that generally opposing portions of the tilt nut are in direct contact with the wall structure defining the column housing wall opening may include locating the tilt nut so it is in only direct line contact with the wall structure defining the column housing wall opening.

As can be seen, it is thus possible to realize a unique assembly (and associated methods) that enables a tilt function within the steering column assembly that reduces the amount of torque felt on the tilt screw, reduces the number of parts needed to provide a tilt function to the steering column assembly, or both.

DETAILED DESCRIPTION

Figure 1:
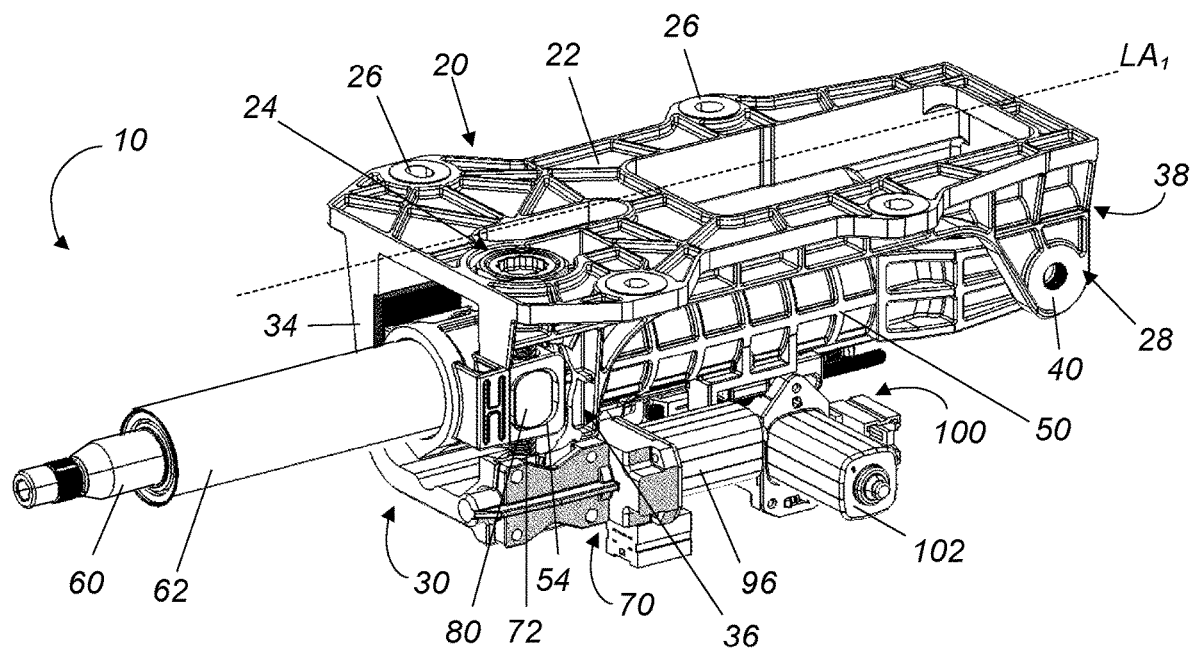
FIG. 1 is a perspective view of an illustrative assembly in accordance with the present teachings.

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

In a very general sense, the teachings herein relate to an improved assembly by which a motor operates to actuate an elongated actuatable member having a longitudinal axis (e.g., to rotate a tilt screw that is rotatable about its longitudinal axis). The elongated actuatable member (e.g., the tilt screw) is engaged with a position securing member that at least partially surrounds the elongated actuatable member (e.g., the tilt screw is threadingly engaged with a nut) and is pivotally carried within a column housing. As the elongated actuatable member is actuated by the motor (e.g., the tilt screw rotates), the position securing member (e.g., the tilt nut) moves along the elongated actuatable member (e.g., the tilt screw), pivots relative with the column housing, and causes the column housing to be raised or lowered (it will be appreciated that the column housing may be pivotally fixed to a mounting bracket at a location along the mounting bracket). As will be demonstrated, it may be possible to maintain a load transmitted from the column housing so it is substantially on axis with the longitudinal axis of the elongated actuatable member (e.g., the tilt screw), which may also be substantially on axis with a through bore of the position securing member (e.g., it may also be substantially on axis with a threaded bore of the tilt nut).

For example, in one general sense, the teachings herein relate to an improved assembly by which a motor (e.g., an electric motor) operates to rotate a generally vertically oriented tilt screw having a longitudinal axis. The tilt screw is threaded through a tilt nut (which may be made, as any other position securing member generally of the teachings, of a polymeric material, such as an acetal or polyoxymethylene (e.g., Delrin®)) that bears at least in part against a column housing surface in a manner for resisting vertical lash (e.g., on one side of the column housing, laterally of a column housing longitudinal axis). Rotating the tilt screw about its longitudinal axis causes the tilt nut to be raised or lowered along a length of the tilt screw. As the tilt nut raises or lowers, it causes the column housing to move with it. Contact between the tilt nut and the column housing allows pivoting as between the tilt nut and the column housing. In this manner, load transmitted from the column housing can be substantially on axis with the longitudinal axis of the tilt screw (which may also be substantially on axis with a threaded bore of the tilt nut). Such pivotal motion can thus help to avoid torsional resistance from the screw as the column housing raises or lowers. It is contemplated that the tilt nut may be at least partially enclosed by a bushing, where the inner surface of the bushing contacts the tilt nut and the outer surface of the bushing bears at least in part against the column housing surface in a manner for resisting vertical lash.

In general, and as will be appreciated from the description that follows, the present teachings pertain to a steering column assembly, and more particularly, an adjustable steering column assembly (e.g., having tilt and/or telescoping functions). The steering column assembly may include a mounting portion, such as a steering column mounting structure having an upper portion adapted to be fixedly secured within an automotive vehicle, for securing the steering column assembly in a vehicle in a fixed operational position. As will be also seen, the teachings envision that the steering column assembly may include a tilt or rake adjustment that is adapted to allow a user to select an angle of inclination of a steering wheel, a reach adjustment that is adapted to allow a user to select an appropriate fore-aft position of the steering wheel, or both. In general, any such adjustment may be controlled by a motor or a suitable user operating device (e.g., a lever, an electromechanical actuator, or otherwise).

The teachings describe aspects useful for an adjustable steering column assembly for an automotive vehicle (e.g., an adjustable rake and/or reach steering column assembly). In general, an assembly of the teachings herein may include a steering shaft (e.g., one that can be coupled with a steering wheel or other steering device) and/or an inner column tube that supports the steering shaft (e.g., via one or more bearings). A column housing may be employed. It may be adapted to telescopically couple with the inner column tube (e.g., each may have a longitudinal axis that is generally parallel or even coaxial with each other). A bracket, such as a steering column mounting structure, may be employed for at least partially securing either or both of the inner column tube or the column housing to the vehicle (e.g., to a cross-vehicle structure). The steering column assembly may include a tilt subassembly that permits angular adjustment of the tilt of the steering wheel (or other steering device) relative to the user or vehicle operator. The tilt subassembly may include a motor (e.g., a tilt motor or motor that controls both tilt and telescoping adjustment). The motor may cause rotation of a tilt screw within the assembly. The tilt screw may have a threaded shank portion that engages with a tilt nut. The tilt nut may be positioned at least partially within and maintain contact with the column housing. The tilt nut may move along the tilt screw (e.g., upwardly or downwardly) as a result of the engagement between the motor and the tilt screw. As the tilt nut moves, the column housing may also pivotally adjust and move, thereby assisting in the angular adjustment of the steering column assembly (e.g., the steering wheel).

With more attention now to the details of the adjustable steering column assembly (e.g., rake, reach, or both) herein, they generally will include a tube that is operatively connected with a steering wheel (not shown), e.g., via a steering shaft. One such tube, referred to herein as an inner column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the inner column tube typically may be made of or otherwise include a suitable metal, such as one or more of iron (e.g., steel), magnesium, zinc, or aluminum.

The inner column tube may be generally cylindrical and hollow. It may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel not shown). It may have a forward end portion that penetrates through and may be supported by a bearing, a key lock collar or both. As noted, the steering shaft may be supported for rotation at least in part by the inner column tube and have a longitudinal axis that may be generally coaxially aligned with the longitudinal axis of the inner column tube.

The adjustable steering column assembly may include one or more brackets or steering column mounting structures that may be employed for receiving at least a portion of the steering shaft. The one or more brackets or steering column mounting assemblies may secure the steering column assembly (e.g., an adjustable rake and/or reach steering column assembly) within the automotive vehicle. By way of example, a steering column mounting structure may include an upper portion that is adapted to be fixedly secured within an automotive vehicle, such as to a vehicle structure, such as a cross vehicle beam, instrument panel, or otherwise. The steering column mounting structure may include one or more downwardly disposed side walls extending from the upper portion of the mounting structure (e.g., forming a collar portion, an area for a pivotal connection with the column housing, or each). The steering column mounting structure may include a single unitary structure or a plurality of components assembled together in an assembly to define the steering column mounting structure. The steering column mounting structure may be a cast structure (e.g., a structure made by casting a mass), a forged structure (e.g., a structure made by forging a metal mass), a machined structure, a consolidated structure (e.g., a structure made by a step of sintering and/or pressing a powder metal mass), or any combination thereof. One approach is to cast the steering column mounting structure to form an aluminum alloy casting. The steering column mounting structure may be configured for integrating functions of mounting within a vehicle and accommodating a tilt function of the assembly relative to a vehicle operator. The steering column mounting structure may include a housing structure, a flange structure, or both for receiving a tilt subassembly (e.g., one that is motorized), a telescoping motor subassembly (e.g., one that is motorized), or both.

The steering column mounting structure may include a plurality of ribs. The steering column mounting structure may include one or more openings through which a fastener may be passed for attaching the mounting structure to the vehicle. The mounting structure may include an upper portion, at least part of which is adapted to abut against the automotive vehicle structure to which it is attached. For example, for attaching to a generally flat cross-vehicle beam, instrument panel, or both, which is to be disposed above the mounting structure, the mounting structure may include a generally planar upper portion. The upper portion may have a longitudinal axis that extends along the length of the upper portion (e.g., spanning from the forward portion of the steering column mounting structure to the rearward portion of the steering column mounting structure). The upper portion may include one or more mounting apertures for mounting the mounting structure to the automotive vehicle via one or more fasteners. The upper portion may include one or more openings defined therein for accessing elements of the steering column assembly, such as a tilt screw.

The steering column mounting structure may have one or more elements extending therefrom, such as one or more pairs of generally opposing downwardly disposed side walls (e.g., located toward a forward end of the steering column mounting structure, toward a rearward end, toward the center, or combination thereof). The downwardly disposed side walls may be integrally formed with the upper portion (e.g., so that the steering column mounting structure is formed from a single piece). One or more of the downwardly disposed side walls may be a discrete element from the upper portion and may be separately attached to the upper portion. Any, some or all of the downwardly disposed side walls may project outward and/or downward relative to the upper portion (e.g., they may be generally orthogonally or obliquely disposed relative to the upper portion).

The steering column mounting structure may include a pair of downwardly disposed connecting walls, which provide an area of connection to another element of the steering column assembly (e.g., a column housing). The walls may be disposed toward a forward portion of the mounting structure. The connecting walls may include one or more openings for receiving a fastener that penetrates through the wall and into a portion of the column housing (e.g., a pivot mounting location) to create a pivotal connection. One or more connecting walls may include a portion that extends beyond a forward end of the upper portion of the steering column mounting structure.

The steering column mounting structure may be a structure including one or more downwardly disposed side walls, which may be joined together to form a collar portion. The downwardly disposed side walls (e.g., forming the collar portion) may at least partially flank at least a portion of the steering column assembly (e.g., the steering shaft, the inner column tube, the column housing, or combination thereof). For example, the mounting structure may include a collar portion that projects away from a lower surface of the upper portion. The collar portion may be defined to include a completely closed or at least partially enclosed structure against which the inner column tube may abut. One or more of the downwardly disposed side walls (e.g., forming the collar portion) may be located at or toward a rearward end of the steering column mounting structure. The collar portion may have an asymmetric structure, such as that depicted herein as resembling a capital letter "D," within which one or more components (e.g., a drive member such as a rod) of a motorized tilt subassembly are received. The steering column mounting structure may have a generally "U" shaped wall or collar portion (e.g., where the free ends of the U contact or are connected to the upper portion). One or more of the downwardly disposed side walls (e.g., one or more walls of the collar portion) may include an opening therein that is generally juxtaposed with an opening the column housing (e.g., for accommodating a tilt nut). The positioning of such opening in the mounting portion may allow for accessing the tilt nut even as the steering column assembly is in an assembled position.

The adjustable steering column assembly may include a column housing adapted to carry the inner column tube having a steering shaft therein. The column housing may be generally elongated. It may have a generally cylindrical configuration to receive at least a portion of the steering shaft, the inner column tube, or both. The column housing may have a longitudinal axis. The longitudinal axis may be generally parallel to or coaxial with the longitudinal axes of the steering shaft, the inner column tube, or both. The column housing may be fixed in position along its length for affording a generally upward and downward pivotal motion in relation to the steering column mounting structure. As indicated, a column housing may be pivotally coupled with the steering column mounting structure (e.g., at a forward end of both the mounting structure and the column housing), for example, at one or more of the downwardly disposed side walls, such as the connecting walls located at the forward portion of the mounting portion. The pivot mounting location may be at or within about 20, 30, 40 or 50 mm of a forward end of the column housing. The pivot mounting location may be on an underside of the column housing, on a top side of the column housing, or at some location in between the top side and the underside of the column housing. For example, the column housing may have a lower portion that has laterally projecting flanges over at least a portion of the column housing length. The flanges may project form both sides of the column housing. The flanges may project laterally outward to a location that extends beyond the outermost reach of the wall from which it projects. The coupling between the mounting structure and the column housing may be adapted to permit steering shaft adjustment (e.g., tilt adjustment, telescoping adjustment, or both, such as by way of the tilt subassembly, the telescoping subassembly or both).

The column housing may be a cast structure (e.g., a structure made by casting a mass), forged structure (e.g., a structure made by forging a metal mass), a machined structure (e.g., a structure by forging a metal mass), a machined structure, a consolidated structure (e.g., a structure made by a step of sintering and/or pressing a powder metal mass), or any combination thereof. A cast structure (e.g., including a metal such as aluminum, magnesium, zinc, and/or iron (e.g., steel)), for example, may be an aluminum alloy casting. The column housing may include one or more ribs.

The column housing may include one or more walls. The one or more walls may be located along a side of the housing so that the one or more walls project generally radially outward relative to a longitudinal axis of the housing. The one or more walls may be integrally formed with a portion of the main body (e.g., the area adapted to receive and/or support an inner column tube and/or a steering shaft of the steering column assembly) of the column housing. The one or more walls may be a separate structure that is discrete from the main body of the column housing and attached to a portion of the column housing. For example, a stamping could be attached to the cast portion of the column housing to provide the one or more walls of the column housing. The one or more walls may be configured to receive at least a portion of the tilt subassembly (e.g., a tilt screw, a tilt nut, or both).

The one or more walls (e.g., integrally formed with the main body of the column housing or a separate structure discrete form the main body of the column housing and attached thereto) in the column housing may include an opening therein, with the opening being adapted for receiving, contacting, and/or supporting a tilt nut of the tilt subassembly. The wall opening may be defined by at least a portion of the wall structure of the column housing. The wall opening of the column housing may be located transversely of the longitudinal axis of the column housing. The wall opening of the column housing may be located on a single side only of the column housing. Therefore, the column housing wall opening and the tilt screw may both be located transversely of the longitudinal axis of the column housing on a single side only of the column housing. Two or more sides of the column housing may include a wall opening (e.g., if two or more tilt screws are employed). The wall opening of the column housing may have a maximum height and a maximum width. The wall opening may have any shape that is capable of receiving, contacting, and/or supporting at least a portion of a tilt nut. The wall opening may be defined by one or more flat surfaces and/or one or more curved surfaces. The wall opening and the tilt nut may have a similar shape. The wall opening and the tilt nut may have different shapes. The wall opening may be a polygonal shape. For example, the wall opening may be generally rectangular. The wall opening may be generally oblong. The wall opening may be generally racetrack shaped. The wall opening may be defined by one or more rounded or curved segments (e.g., concave segments where the curve dips toward a point within the opening, convex segments where the curve extends away from a point within the opening, or both). Each of the curved segments may have generally the same radius of curvature. Each curved segment, may have a different radius of curvature. The wall openings may have one or more angles or corners joining one or more generally straight segments. One or more of the corners may be generally rounded. Opposing sides of the wall opening (e.g., if the opening is generally rectangular) may be generally symmetrical. Opposing sides of the wall opening may be mirror images of each other. Opposing sides of the wall may be different shapes, curvatures, lengths, or combination thereof. The maximum height of the wall opening of the column housing may be about 15 mm or more, about 20 mm or more, or about 25 mm or more. The maximum height may be about 45 mm or less, about 35 mm or less, or about 30 mm or less. The maximum width of the wall opening of the column housing may be about 15 mm or more, about 20 mm or more, or about 25 mm or more. The maximum width may be about 45 mm or less, about 35 mm or less, or about 30 mm or less. The maximum width of the column housing wall opening may exceed the maximum width of the tilt nut positioned therein (e.g., to allow movement or rotation of the tilt nut within the opening). The maximum height of the column housing wall opening may be approximately equal to the height of the tilt nut. The maximum height may be greater than the height of the tilt nut (e.g., to accommodate some rotation of the tilt nut within the opening).

The steering column assembly may include a tilt subassembly for causing adjustment of the steering shaft (and steering wheel) in an upward or downward direction in relation to a vehicle operator. The tilt subassembly may include a motor that initiates movement of the steering column assembly by operatively driving a drive member, such as an externally projecting elongated drive shaft that is threaded or that has gear teeth over at least a portion of its length. The drive shaft may have a longitudinal axis that is oriented generally parallel with the longitudinal axis of the steering shaft, inner column tube, column housing, steering column mounting structure, or a combination thereof, at least at certain positions or angular adjustments of the steering wheel. The externally projecting elongated drive shaft (e.g., a threaded drive shaft) may have a longitudinal axis oriented generally perpendicular relative to the longitudinal axis of a tilt screw of the tilt subassembly, at least at certain positions or angular adjustments of the steering wheel. The motor may cause the drive shaft to rotate, move in a fore and aft direction, otherwise move, or a combination thereof. The drive shaft may engage with a portion of a tilt screw at least partially housed within the column housing. The tilt screw may include one or more engagement elements for engaging with a drive shaft. The one or more engagement elements may include one or more gear portions, one or more internal openings (e.g., having a cross-section shaped like a hex, square, or other polygon), one or more projections from the tilt screw (e.g., having a cross-section shaped like a hex, square, or other polygon) or other features for engaging with the drive shaft. For example, at or near one or both ends of the tilt screw, there may be one or more gear portions that engages with the drive shaft of the motor. As the motor drives the drive shaft, the drive shaft engages with the gear portion of the screw, causing the screw to rotate (i.e., about its longitudinal axis). The motor (e.g., the tilt motor) may remain in a fixed position and may have a gear or a screw. As the gear or screw of the motor shaft rotates, it remains meshingly engaging a portion (e.g., the gear) of the tilt screw, even if the tilt screw pivots or swivels.

The motor of the tilt subassembly may be part of a remote mechanism that initiates movement of the steering column assembly (e.g., upward and downward relative to a vehicle user) by way of the motor within a gear box. The output of the gear box may be coupled to the tilt screw via a drive shaft (e.g., a flexible drive shaft). The drive shaft may engage with or be secured to an engagement element of the tilt screw. An engagement element of the tilt screw may include an internal opening or cavity within the tilt screw (e.g., shaped as a hex, square, or other polygon) that is adapted to receive at least a portion of the flexible drive shaft. The engagement element may be a protrusion that is received by an internal opening or cavity of the drive shaft. The gear box may contain a gear reduction (e.g., a spur or worm type gear reduction), and the drive shaft (e.g., a flexible drive shaft), via the output from the remote mechanism, may transmit the torque from the gear reduction to the screw. This may cause the tilt screw to rotate about its longitudinal axis to support and cause movement of the tilt nut along the tilt screw.

The tilt subassembly may include an elongated actuatable member, such as a tilt screw, located at least partially within the column housing, steering column mounting structure, or both. The tilt screw may include (e.g., at one or each of the ends of the tilt screw) or be positioned within one or more bearings and/or bearing openings (e.g., located within or adjacent the mounting structure, column housing, or both) to allow for the rotation of the tilt screw within the assembly. As mentioned, the steering column mounting structure may include an opening defined within the upper portion through which the tilt screw can be accessed when installed within the assembly. The tilt screw may include a threaded shank portion that engages with and supports a tilt nut (e.g., a tilt nut having a threaded bore). The tilt screw may have a longitudinal axis (e.g., extending along the length of the tilt screw, from one end of the screw to the opposing end of the screw). The longitudinal axis of the tilt screw may be non-parallel relative to the longitudinal axis of the upper portion of the steering column mounting structure but may be pivotable over a range of about ±15°, about ±10°, about ±5°, or about ±3°. In addition, the longitudinal axis of the tilt screw may be generally orthogonal to the longitudinal axis of the drive member (e.g., drive shaft) of the motor of the tilt subassembly (at least during certain elevations or a neutral position of the steering column assembly). During a tilt or rake adjustment of the steering column assembly, the tilt screw may be permitted to move or pivot within the column housing over a range of about ±15°, about ±10°, about ±5°, or about ±3° from a position orthogonal to the longitudinal axis of the drive shaft. For example, during a raising of the steering shaft (and steering wheel) relative to a user, the tilt screw may pivot and become angled within the column housing. During a lowering of the steering shaft (and steering wheel) relative to a user, the tilt screw may pivot and angle in the opposite direction. The tilt screw may be positioned such that each of a distal and a proximal end relative to the gear are translated about a pivot axis when the column housing is raised or lowered.

The tilt subassembly may include a position securing member that at least partially surrounds the elongated actuatable member, such as tilt nut and optional bushing positioned upon or adapted to receive the tilt screw. The tilt nut may have a threaded bore therethrough adapted to receive the tilt screw (e.g., the threaded shank portion) in threaded engagement. The tilt nut may be positioned at least partially within the column housing wall opening. The column housing wall opening and the tilt nut may be configured to provide direct point, line, or plane contact (which may depend upon the shape of the tilt nut) between the body of the tilt nut and the surface of the column housing defining the column housing wall opening. As mentioned, the height of the column housing wall opening and the height of the tilt nut may be approximately equal to maintain contact between the surface defining the column housing wall opening and the tilt nut. The contact between the tilt nut and the surface defining the column housing wall opening may thereby resist lash in a generally vertical direction while still allowing the column housing, the tilt screw, or both, to rotate freely among different rake positions throughout a full range of operative movement. The contact arranged between the tilt nut and the column housing wall opening may be such that the load transmitting from the column housing wall opening to the tilt nut is substantially on axis with the threaded bore.

The tilt nut may have a body defined by an outer surface. At least a portion of the tilt nut (e.g., the body, the outer surface, or both) may be fabricated from a polymeric material, such as a crystalline polymer, such as an acetal homopolymer (e.g., Delrin® commercially available from DuPont, such as Delrin® 100 grade). The tilt nut may be formed of any polymeric material having two or more of the following properties: good dimensional stability; high fatigue endurance; long-term fatigue endurance; low moisture absorption; good wear and/or abrasion properties; low coefficient of friction; hard and resilient surface; superior impact and/or creep resistance; high resistance to repeated impact; high elongation (e.g., without the need for impact modifiers; excellent machinability; high strength and/or stiffness properties (e.g., without the need for fillers/reinforcements or other modifications); high tensile strength and strain at break (e.g., higher than the standard copolymer); chemical resistance to at least some fuels, hydrocarbons, neutral chemicals and/or solvents; maintenance of advantages at elevated temperatures; and good flow characteristics, fast cycling, thermal stability (e.g., as evidenced by little reduction in the melt viscosity), or combination thereof during processing. The tilt nut may include a threaded bore that may be formed from the same polymeric material as the outer surface and/or body. The threaded bore portion may be a metallic material.

The threaded bore may be inserted into an opening in the body of the polymeric material (e.g., the material forming the outer surface). The polymeric outer surface material may be formed around the threaded bore portion of the tilt nut. The tilt nut may be free of any adjustment screw for resisting lash. The tilt nut may be free of any structure (e.g., any metallic structure) into which the tilt nut is press fit.

The tilt nut may be adapted to move (e.g., rotate, pivot, tilt, move fore and aft, or combination thereof) within the assembly. At least a portion of the tilt nut is still adapted to retain contact (e.g., point, line, or planar contact) with at least a portion of the surface of the column housing defining the column housing wall opening. The tilt nut may be in contact (e.g., in line contact with at least two locations of the surface defining the column housing wall opening) with the column housing throughout the raising and lowering of the column housing. The angle of movement, or rotation may be generally the same angle as the angle of movement or rotation of the tilt screw as the adjustable steering column assembly (e.g., the steering wheel, steering shaft, inner column tube, column housing, or combination thereof) is raised and or lowered in relation to a vehicle operator.

The tilt nut may have a front wall, a rear wall, and one or more side walls. The tilt nut may have a plurality of side walls (e.g., four side wall in a generally rectangular shaped tilt nut). The one or more side walls may connect the front wall with the rear wall. The threaded bore portion may intersect one or more side walls (e.g., two opposing side walls). The threaded bore portion may be generally or approximately parallel with the front wall, the rear wall, or both. The tilt nut may have one or more generally flat walls. For example, the tilt nut may have a generally flat front wall and/or a generally opposing flat rear wall. The tilt nut may have one or more curved walls (e.g., hourglass shaped, curved or angled segments curving or angling into or away from the body of the tilt nut, or a combination thereof). One or more side walls (or where one or more side walls joins another side wall or a front or rear wall) may have rounded portions (e.g., corners, such as for defining a generally race track shape). The one or more side walls may include one or more ribs. The ribs may provide additional strength or stiffness to the tilt nut. The ribs may help to reduce the weight of the nut. The ribs may assist in controlling areas of contact between the nut and the optional bushing or the surface of the column housing defining the column housing wall opening. The front wall and/or rear wall (e.g., the perimeter) may be generally polygonal in shape, generally rectangular in shape, generally ovular in shape, generally oblong in shape, generally hourglass in shape, or a combination thereof. The side walls connected to the front wall and/or rear wall may generally follow the contours of the perimeter of the front wall, rear wall or both. For example, if the perimeter of the front wall has a curved segment, the face of the side wall joined at that curved segment may be curved in a similar shape (i.e., rather than having a planar face). The front wall and/or rear wall may have one or more angular segments (e.g., two planar segments joined together to form one or more angles), generally curved segments, generally convex segments, generally concave segments, generally sinusoidal shaped segments, or a combination thereof. The front wall and/or rear wall may have one or more rounded corners (e.g., between segments forming the perimeter of the front wall and/or rear wall). One or more of the side walls may be generally flat or planar. One or more of the side walls may have a generally hourglass shape. One or more of the side walls may be generally curved, generally concave (e.g., the face of the wall curving into the body of the tilt nut), generally convex (e.g., the face of the wall curving away from the body of the tilt nut), or a combination thereof. One or more of the side walls may include one or more angular segments (e.g., two or more planar segments joined together to form one or more angles). For example, a series of planar segments may be arranged in angular relationship with each other to generally form an indentation in a side wall similar to a concave shape. One or more of the side walls may include rounded edges (e.g., where the side wall joins with the front wall, rear wall, or both).

One or more of the side walls may include one or more generally elastic or springing members, such as wings or tabs. The wings may extend from one or more side walls (e.g., two wings, arranged on opposing side walls) and terminate at a free end. The wings may be generally flexible and may flex when a force is applied. The wings may elastically deform. For example, when installing the tilt nut within a wall opening of the column housing, a force may be applied to the wings as the tilt nut is inserted into the wall opening. When the tilt nut is in proper position within the opening, the force applied to the wings may be released, and the wings may return to their original position. The wings may function to retain contact and/or engagement with the surface defining the wall opening in the column housing to maintain the position of the tilt nut (during use and/or during installation of the tilt nut and/or tilt screw), reduce lash within the tilt subassembly (where lash may be defined as clearance or lost motion in a mechanism caused by gaps between the parts), or both.

The present teachings also contemplate an optional bushing adapted to at least partially surround the tilt nut. The bushing may function to constrain or guide the movement of the tilt nut. The bushing may function to reduce stress and/or friction between the tilt nut and the housing. The bushing may be adapted to contact the surface of the column housing defining the surface of the column housing defining the column housing wall opening. The bushing may be generally located around the tilt nut. For example, the bushing may be generally located around the side walls of the nut (e.g., may generally circumscribe the side walls of the tilt nut). For example, the bushing may generally have a C-shape, where a gap between the free ends of the bushing may be adapted to provide additional flexibility to the bushing (e.g., to receive the tilt nut and/or accommodate tilting or rotation of the tilt nut). The bushing may be generally O-shaped or generally D-shaped to completely surround at least a portion of the tilt nut. The bushing may be generally rectangular. The bushing may be adapted to cover the front face and/or rear face of the tilt nut. The bushing may have one or more rounded edges or corners. The bushing (on the internal surface, external surface, or both) may include one or more generally straight sections. For example, the outer surface may include one or more straight sections adapted to contact and/or slide along the surface of the column housing defining the column housing wall opening. The bushing may be a shape that generally matches the shape of the tilt nut it is to receive. The bushing may have a maximum internal height and/or maximum internal width (i.e., the portions defining the area within which the tilt nut is adapted to be received) that is greater than the maximum height and/or maximum width of the tilt nut. The inner dimensions of the bushing may be larger than the outer dimensions of the tilt nut to allow the tilt nut to move (e.g., tilt or rotate) within the bushing during a tilt adjustment of the steering column assembly. The bushing may include openings at the top and bottom of the structure to accommodate the tilt screw extending through the tilt nut. The openings of the bushing may also be threaded.

In assemblies where the bushing is used around the nut, it is contemplated that the outer surface of the bushing contacts the surface of the column housing defining the column housing wall opening. The presence of the bushing may reduce the contact stress between the tilt nut and the column housing. The tilt nut may contact the inner walls of the bushing in a radius-on-radius condition, as the tilt nut is permitted to tilt or rotate within the assembly. The bushing may then contact the surface of the column housing defining the column housing wall opening in a flat-on-flat condition. The bushing may be permitted to rotate around the nut, the nut may be permitted to rotate within the bushing, or both. The bushing may be permitted to slide on the surface of the column housing defining the column housing wall opening (e.g., through line or plane contact), the surface of the column housing defining the column housing wall opening may be permitted to slide on the surface of the bushing, or both. The bushing may maintain contact with at least a portion of the column housing. The bushing may be of sufficient dimensions that it is able to rotate or tilt within the column housing wall opening. The bushing may be of sufficient dimensions (e.g., where the bushing is too wide, tall, or both, to rotate or tilt) that it is not permitted to rotate or tilt within the column housing wall opening. The bushing may be of sufficient dimensions that it is not permitted to rotate or tilt within the column housing wall opening at the same angle as the tilt nut (e.g., the tilt nut may be permitted to tilt to form a larger angle than the maximum angle of the bushing relative to the vertical axis). The bushing may be permitted to move vertically (along a vertical axis of the assembly), horizontally (e.g., along a longitudinal axis of the assembly), or both, within the column housing wall opening.

The adjustable steering column assembly may be assembled by threading the tilt screw through the tilt nut. If a bushing is used, the nut may be inserted into the bushing and the tilt screw may be threaded through both the tilt screw and the bushing. The tilt screw may be oriented so that its longitudinal axis is positioned generally vertically within the assembly (e.g., within the column housing and/or the mounting sstructure). One end of the tilt screw can be positioned generally within the opening in the upper portion of the mounting structure. The opposing end of the tilt screw (e.g., having a gear portion for engaging with the drive shaft of the motor) may be positioned near the motor, such as adjacent the externally projecting elongated drive shaft (e.g., a threaded drive shaft), so that the drive shaft can engage with the gear portion to enable the screw to rotate (e.g., about its longitudinal axis) during a tilt or rake adjustment of the assembly. The tilt nut may be located within the column housing wall opening so that generally opposing portions of the tilt nut may be in direct contact (e.g., point contact, line contact, or plane contact) with the wall structure defining the column housing wall opening. During assembly, it is possible that the tilt nut may be placed within the column housing wall opening prior to the tilt screw being installed in the assembly. For example, the tilt nut may be positioned within the opening of the column housing and the tilt screw may then be screwed or inserted through the threaded bore of the tilt nut. The tilt screw may be inserted through the bottom, with the end of the tilt screw being directed toward the opening in the upper portion of the steering column mounting structure. Instead, the tilt screw may be inserted through the top (e.g., through the opening in the upper portion of the steering column mounting structure) and directed toward the motor (e.g., a tilt motor). In such assembly, the gear portion may be secured to the tilt screw once at least a portion of the tilt screw has traveled through the tilt nut.

As the tilt subassembly and/or telescoping subassembly via one or more motors (or other user operating devices) initiates movement of the steering column toward or into a desired position, this permits steering shaft adjustment (rake and/or reach). In a tilt adjustment, the motor may cause movement (e.g., angular adjustment) of the column housing upward and/or downward relative to the user (and therefore movement of the inner column tube, the steering shaft, or both). The motor may have an externally projecting elongated drive shaft (e.g., a threaded drive shaft) that may engage the gear portion of the tilt screw for rotating the tilt screw and causing the tilt nut to move along the tilt screw (e.g., upwardly and/or downwardly). As the tilt nut maintains contact with the surface defining the wall opening of the column housing, this causes the column housing to move with the tilt nut to thereby raise and/or lower the column housing relative to the mounting structure. Therefore, the motor is configured to operatively rotate the gear portion of the tilt screw and cause the tilt nut to advance toward the gear portion (e.g., if lowering) or withdraw away from the gear portion (e.g., toward the mounting structure if raising). This movement cases the column housing to raise or lower relative to the mounting structure. As a result of the outer surface of the tilt nut body contacting the surface of the wall opening of the column housing, the longitudinal axis of the threaded shank portion of the tilt screw is able to pivot fore or aft generally relative to the column housing as the column housing is raised or lowered. The pivoting of the tilt screw, the tilt nut, or both, reduces the amount of stress and/or torque on the tilt screw. At one or both ends of the tilt screw, there may be one or more elements acting as a stop for the tilt nut, thereby preventing the tilt nut (and steering shaft, steering wheel, inner column tube, column housing, or combination thereof) from raising past a certain point or from lowering past a certain point.

The steering column assembly as disclosed herein may also include a telescoping subassembly for adjusting the steering shaft in a fore or aft direction generally along the longitudinal axis of the steering shaft. Such adjustment may be possible through one or more levers or other user-actuated devices. Such adjustment may be possible through one or more motors adapted for selectively driving the steering shaft (e.g., by way of a rod or other drive member) in a fore or aft direction. The same motor of the tilt subassembly may also provide for telescoping adjustment (or "reach" adjustment). A separate motor may be used for telescoping adjustment. The telescoping subassembly may include an electric motor that has a motor shaft that operatively drives a drive member (e.g., a rod that is threaded or has gear teeth over at least a portion of its length). The shaft may drive the drive member by use of one or more gears. It may drive the drive member by way of a threaded nut. The motor shaft may have a longitudinal axis that is oriented generally parallel with the longitudinal axis of the steering shaft and/or inner column tube. The motor shaft may have a longitudinal axis that is oriented generally transverse with the longitudinal axis of the steering shaft and/or inner tube. The telescoping motor subassembly may be such that it includes a housing within which the motor may be at least partially located. The housing may include one or more flat surfaces that are adapted to slidingly bear against another surface (e.g., a bracket, flange of the column housing, or some other mounting structure), which other surface may be part of, or may be operably connected with the column housing. Such flat surfaces may be a part of the mounting structure for securing the telescoping assembly to the overall assembly.

In general, the teachings herein envision a steering column assembly that employs a column housing with an inner column tube. The teachings are not limited solely to such assemblies. The teachings also have general application to other types of steering column assemblies. Without limitation, for example, the teachings are also contemplated for use with a steering column assembly that is known typically as a translating column type assembly. Such an assembly may integrate a column housing with an inner column tube. Such integration may be in the form of a single fabricated unit (e.g., a casting). The unit may be mounted within a vehicle. It may be mounted, for example, by way of one or more pins in one or more slots.

Put another way, by way of summary (without limitation) of the general teachings herein, in a general respect, the present teachings relate to an adjustable steering column assembly. The assembly includes a steering shaft supported by other elements of the steering column assembly. For example, other elements may include a column housing, which may have one or more of the features as described in the present teachings. It may include an inner column tube which may have one or more of the features as described in the present teachings and being adapted for telescopic adjustment within the column housing. It may simply be a tube or other suitable hollow structure (e.g., the single fabricated unit integrated structure referenced above) for receiving a steering shaft. A steering shaft, which may have one or more of the features as described in the present teachings (which may support a steering wheel that is attached to it in part and may optionally be a part of the assembly), may be supported for rotation (e.g., by one or more bearings), at least in part by the other elements of the steering column assembly (e.g., the inner column tube, the column housing, or both) and having a longitudinal axis. A steering column mounting structure, which may have one or more features as described in the present teachings, may be employed for at least partially carrying the steering shaft, inner column tube, column housing, or combination thereof, and attaching the assembly within a vehicle (e.g., to a cross-vehicle structure, instrument panel, or other elements of a vehicle capable of supporting the steering column assembly). As described, the steering column mounting structure may include a portion that provides one or more areas of attachment to the column housing (e.g., downwardly disposed side walls) for allowing tilt adjustment (e.g., by joining the column housing and the steering column mounting structure in a pivoting relationship).

Figure 2:
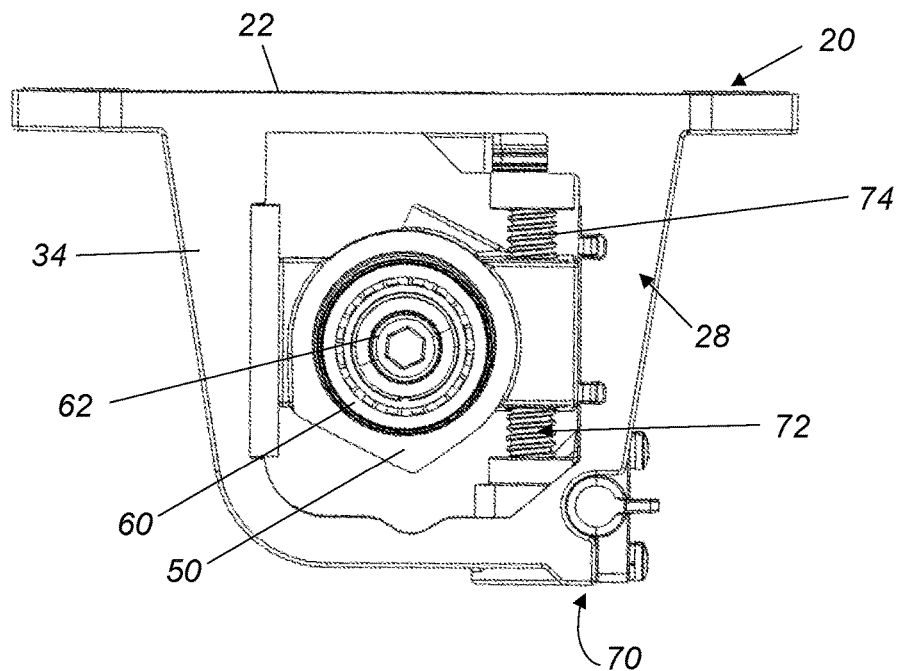
FIG. 2 is a rear view of the assembly of FIG. 1.

Turning now to the figures, FIGS. 1 and 2 are a perspective view and a rear view, respectively, of an exemplary adjustable rake steering column assembly 10 having a steering column mounting structure 20 and a column housing 50 adapted to carry an inner column tube 60 and a steering shaft 62, which supports a steering wheel or other steering device (not shown). The steering column mounting structure 20 includes an upper portion 22, having a longitudinal axis $LA_1$, that is adapted to be fixedly secured within an automotive vehicle. The upper portion 22 has an opening 24 through which at least a portion of the tilt subassembly 70 (e.g., the tilt screw 72) can be accessed. The upper portion 22 also includes a plurality of mounting apertures 26 for mounting the mounting structure 20 within the automotive vehicle via one or more fasteners. At a rearward portion 30 of the mounting structure 20, there are a pair of downwardly disposed side walls 28 forming a collar portion 34. At a forward portion 38 of the mounting structure 20, there are a pair of downwardly disposed side walls 28 acting as connecting walls 40 for pivotally joining the mounting structure 20 with the column housing 50 at a pivot mounting location 58 (see FIG. 3).

Figures 5A, 5B, 5C:
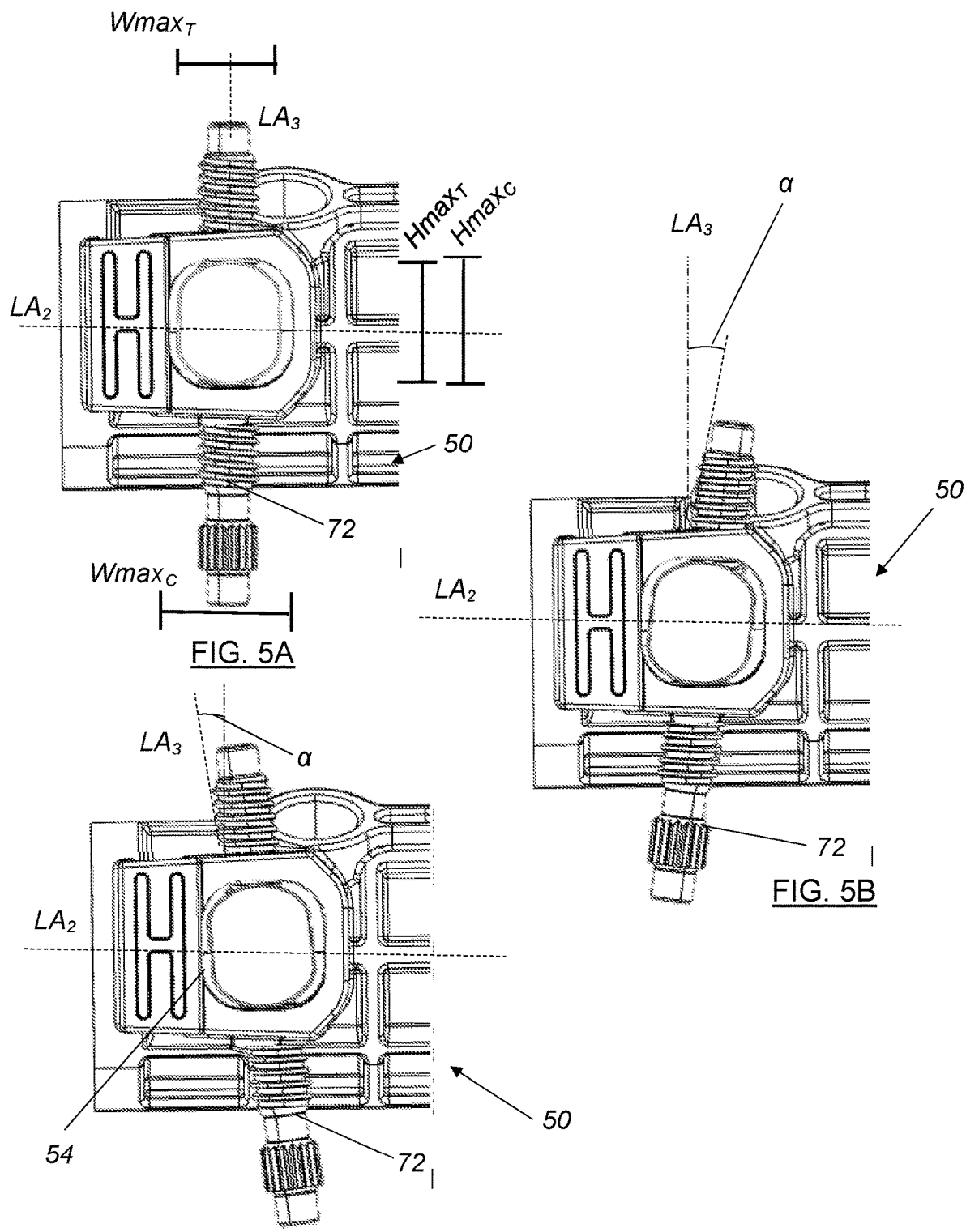
FIGS. 5A, 5B, and 5C illustrate the possible movement of the tilt screw during a tilt adjustment in accordance with the present teachings.

The adjustable rake steering column assembly 10 includes a column housing 50 having a longitudinal axis $LA_2$ (see FIGS. 5A-5C). The column housing 50 includes a wall 52 having a column housing wall opening 54 adapted to at least partially receive, contact, and/or support a tilt nut 80. The mounting structure 20 also includes an opening 36 that is juxtaposed with the column housing wall opening 54, for providing access to the tilt nut or for easing installation of the tilt nut within the assembly, though it is also contemplated that other exemplary mounting structures may not have such an opening.

The steering column assembly 10 also includes a tilt subassembly 70 which provides for a tilt or rake adjustment function so that the angle of the steering wheel (not shown) can be adjusted upwardly or downwardly relative to a user or vehicle operator. The tilt subassembly 70 includes a motor 96 (e.g., a tilt motor) that engages with a tilt screw 72. The tilt screw 72 has a threaded shank portion 74, which is in threaded engagement with the tilt nut 80, and the tilt nut is caused to move along the tilt screw, thereby causing upward or downward adjustment of the steering wheel (not shown), steering shaft 60, inner column tube 62, and column housing 50. The steering column assembly 10 also includes a telescoping subassembly 100, which provides for telescoping adjustment of the steering wheel in a fore and aft direction relative to the user or vehicle operator. The telescoping subassembly 100 includes a motor 102 (e.g., a telescoping motor), though it is also possible that telescoping adjustment may be performed by a user-actuated device such as a lever.

Figure 3:
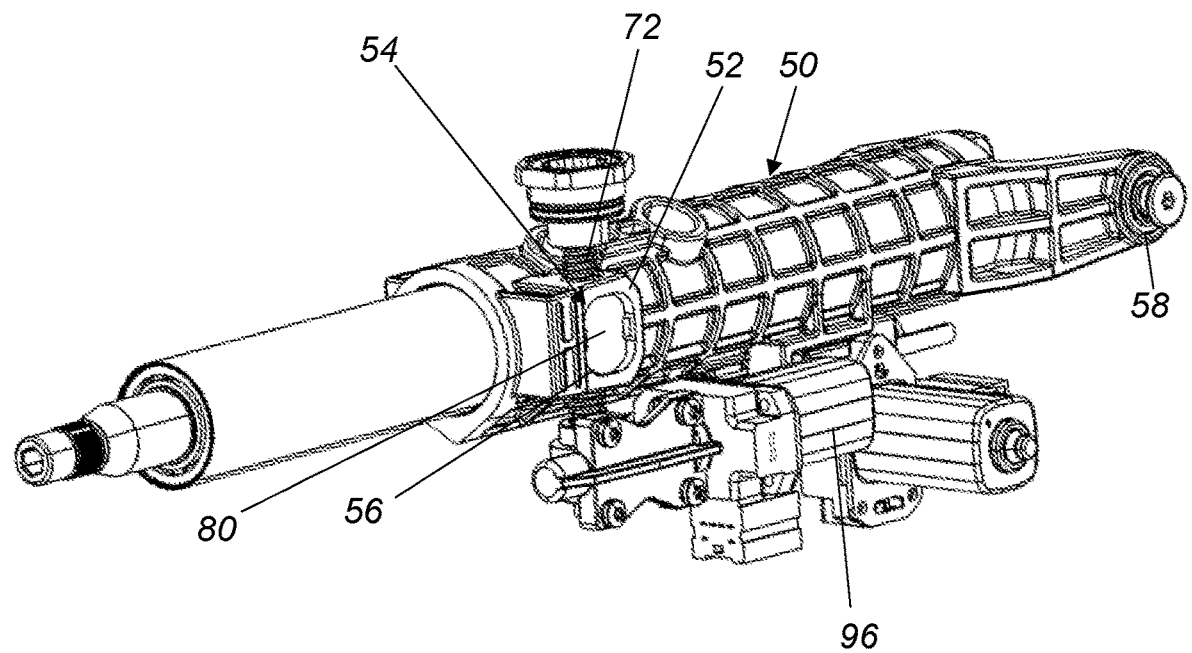
FIG. 3 is a perspective view of the illustrative assembly of FIG. 1 with the steering column mounting structure removed.

FIG. 3 illustrates a steering column assembly with the steering column mounting structure removed. The tilt screw 72 remains generally fixed within the column housing 50 and rotates about its longitudinal axis as a result of the engagement with the motor 96. The raising and lowering of the column housing 50 during a tilt or rake adjustment occurs as the tilt nut 80 moves upwardly or downwardly along the tilt screw 72. At least a portion of the tilt nut 80 contacts the surface 56 defining the column housing wall opening 54.

Figure 4A:
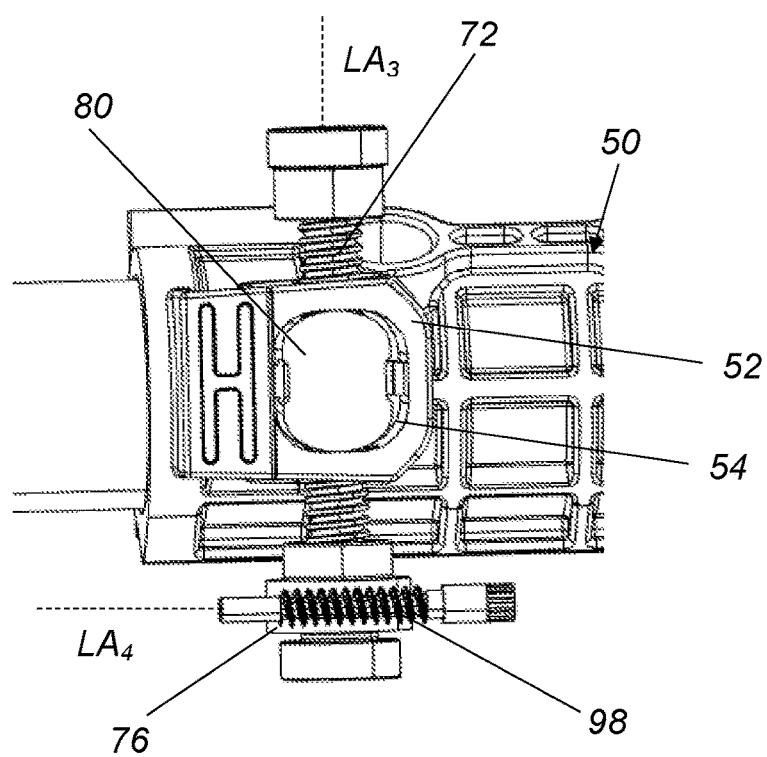
FIGS. 4A and 4B are enlarged views of a tilt subassembly in accordance with the present teachings.
Figure 4B:
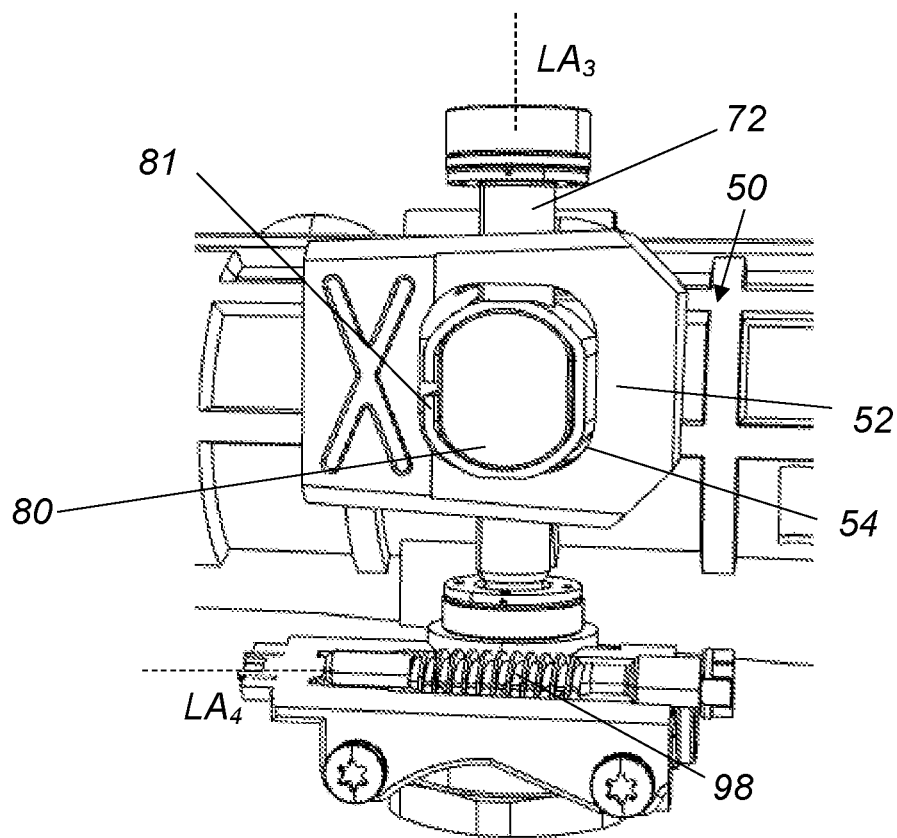

FIGS. 4A and 4B are an enlarged view of the tilt nut 80 within the column housing wall opening 54 (i.e., the opening in the wall 52 of the column housing 50). The tilt screw 72 is threaded through the tilt nut 80, and the tilt screw 72 has a longitudinal axis $LA_3$. The motor 96 (see FIG. 3) includes an externally projecting elongated drive shaft 98 having a longitudinal axis $LA_4$. In this tilt position, the longitudinal axis $LA_3$ of the tilt screw 72 and the longitudinal axis $LA_4$ of the elongated drive shaft 98 are generally perpendicular. The elongated drive shaft 98 engages with a gear portion 76 of the tilt screw 72, which causes the tilt screw 72 to rotate about its longitudinal axis $LA_3$, thereby causing the tilt nut 80 to move along the tilt screw (i.e., upwards or downwards). Because of the contact between the tilt nut 80 and the surface defining the opening of the column housing wall opening, this also causes the column housing to move upward or downward with the tilt nut, and the column housing pivotally adjusts at the pivot mounting location 58 (e.g., to raise and lower relative to the vehicle operator; see FIG. 3). FIG. 4B illustrates a tilt nut 80 surrounded by a bushing 81. The bushing 81 serves to contact the wall 52 of the column housing 50 defining the column housing wall opening 54. The inner surface of the bushing 81 contacts and holds the tilt nut 80. The bushing 81 allows the tilt nut 80 to contact the bushing 81 in a radius-on-radius condition, and the bushing 81 contacts the wall 52 of the column housing 50 defining the column housing wall opening 54 in a flat-on-flat condition, which may reduce the contact stress between the tilt nut and the column housing.

FIGS. 5A, 5B, and 5C illustrate the ability of the tilt nut 80 and the tilt screw 72 to pivot fore or aft generally relative to the column housing 50 as the column housing is raised or lowered. FIG. 5A illustrates the longitudinal axis $LA_3$ of the tilt screw 72, which is generally perpendicular to the longitudinal axis $LA_2$ of the column housing. During a rake adjustment, the tilt screw 72 and the tilt nut 80 may pivot within the column housing wall opening 54 at an angle α, measured from a neutral position (where the bit screw would be in a perpendicular relationship to the longitudinal axis $LA_2$ of the column housing), as shown in FIGS. 5B and 5C. As seen in these figures, the column housing wall opening 54 has a maximum height $Hmax_C$ and a maximum width $Wmax_C$. The tilt nut 80 has a maximum height $Hmax_T$ and a maximum width $Wmax_T$. $Hmax_C$ and $Hmax_T$ are generally equal, allowing for the tilt nut to maintain contact with the surface defining the column housing wall opening, while $Wmax_C$ is generally larger than $Wmax_T$, thereby allowing the tilt nut 80 to move within the opening to allow the tilt screw 72 to pivot and reduce the amount of torque and/or stress on the tilt screw. Where a bushing is used, it is contemplated that the maximum height of the bushing may be between the maximum heights of the tilt nut and column housing wall opening. Where a bushing is used, it is contemplated that the maximum width of the bushing may be between the maximum widths of the tilt nut and column housing wall opening. It is also contemplated that the tilt nut may be smaller (in height, width, or both) when a bushing is used so the outer dimensions of the bushing would be approximately equal in height, width or both to the maximum height and/or maximum width as a tilt nut if used alone (e.g., without a bushing).

Figure 6A:
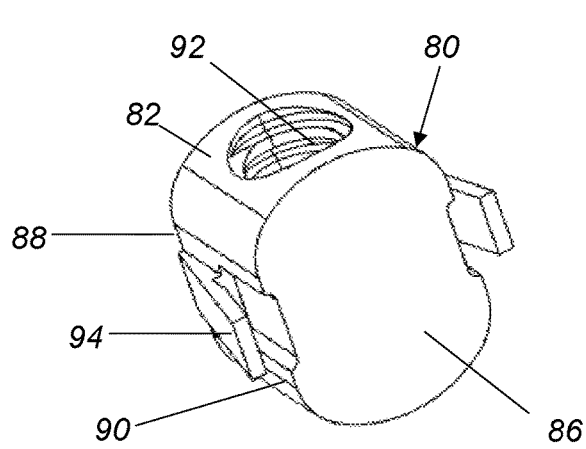
FIGS. 6A and 6B are perspective views of illustrative tilt nuts in accordance with the present teachings.
Figure 6B:
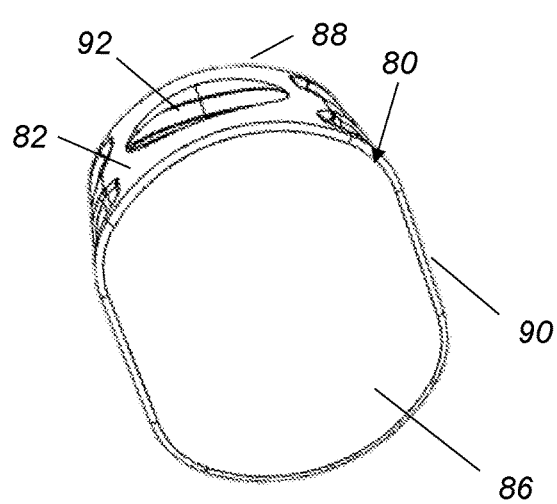
Figure 6C:
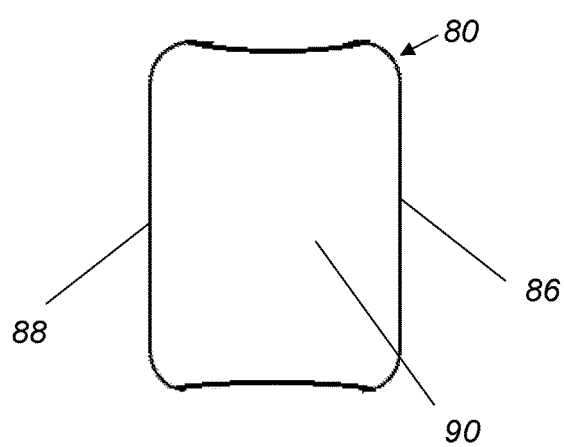
FIG. 6C is a side view of the illustrative tilt nut of FIG. 6B.
Figure 6D:
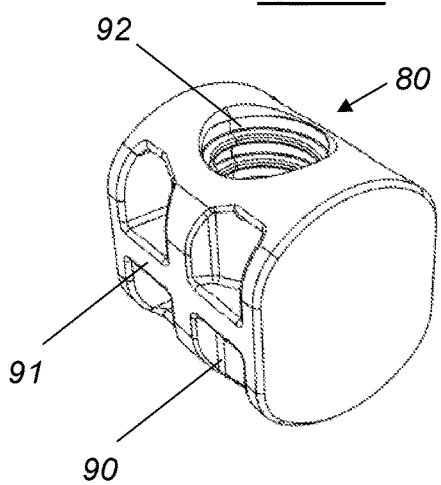
FIG. 6D is a perspective view of an illustrative tilt nut in accordance with the present teachings.
Figure 6E:
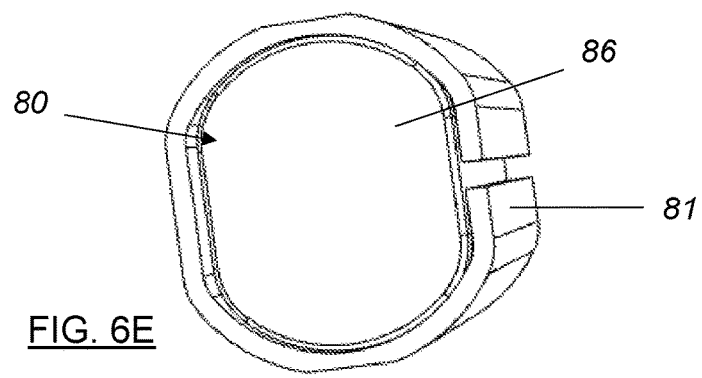
FIG. 6E is a perspective view of a tilt nut and a bushing surrounding the tilt nut in accordance with the present teachings.

FIGS. 6A, 6B, 6C. 6D and 6E are illustrative tilt nuts 80 having a body 82 and an outer surface. The tilt nuts 80 have a front wall 86, a rear wall 88, and side walls 90 joining the front wall and rear wall. The tilt nuts 80 have a threaded bore 92 within the body 82 of the tilt nuts adapted to receive and engage with a threaded shank portion 74 of a tilt screw 72 (see previous figures). The threaded bore 92 is generally parallel to the front wall 86, the rear wall 88, or both, with the bore opening located generally on opposing side walls 90 (i.e., generally intersecting opposing side walls). The tilt nut 80 of FIG. 6A includes wings 94 on opposing side walls 90 of the tilt nut. The wings 94 may engage with the surface 56 defining the column housing wall opening 54 (see FIG. 4A) to stabilize the tilt nut within the assembly, to maintain contact with the surface defining the column housing wall opening, or both. FIG. 6B illustrates a tilt nut 80 having rounded edges or corners, which assists in allowing the tilt nut to tilt or pivot within the column housing wall opening 54 (see FIGS. 5A-5C). FIG. 6C is a side view of a tilt nut 80 having generally concave segments, or curving generally inwardly toward the body of the tilt nut. The curves also assist in allowing the tilt nut to tilt or pivot within the column housing wall opening 54 (see FIGS. 5A-5C). FIG. 6D is a side view of a tilt nut 80 having side walls defined by ribs 91. FIG. 6E illustrates a tilt nut 80 and a bushing 81 located around the tilt nut 80. The tilt nut 80 thereby contacts the bushing 81 and the bushing 81 contacts the column housing (see FIG. 4B), and the housing slides on the bushing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, it may be possible to employ manual adjustment of the steering column assembly (e.g., one or more levers or other user-actuated devices), instead of or in addition to one or more motors within the tilt subassembly and/or the telescoping subassembly. The assembly may include a manually operated steering wheel adjustment subassembly adapted for selectively adjusting the steering shaft in a fore or aft direction generally along the longitudinal axis, selectively raising or lowering the steering shaft, or both. The tilt and/or telescoping subassemblies may include a lever or other adapted for manually actuating the subassembly. The either or both subassemblies may include at least one engagement member that is brought into and out of engagement with the inner column tube for selectively locking the steering shaft into a position desired by a user (e.g., a fore or aft position). The elongated actuatable member may be a rod or a pin. The position securing member may be a bushing or any type of member that is capable of clamping onto the elongated actuatable member. The position securing member may at least partially surround the elongated actuatable member. The position securing member may selectively engage the elongated actuatable member in a manner that may, at least at certain times, resist movement along the elongated actuatable member.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. An adjustable rake steering column assembly, comprising;
   a. a steering column mounting structure;
   b. a column housing adapted to carry an inner column tube having a steering shaft therein, and having a wall with an opening therein, and being fixed in position along its length for affording a generally upward and downward pivotal motion in relation to the mounting structure, the column housing having a longitudinal axis;
   c. a tilt screw having a threaded shank portion and a gear portion, and having a longitudinal axis;
   d. a tilt nut positioned at least partially within the column housing wall opening, the tilt nut having a body with an outer surface and an optional bushing located around at least a portion of the tilt nut, wherein the outer surface or the optional bushing is in contact with a surface defining the column housing wall opening, wherein the tilt nut includes a threaded bore therethrough adapted to receive the tilt screw in threaded engagement, wherein the contact arranged between the tilt nut or the optional bushing and the column housing wall opening is such that the load transmitted from the column housing wall opening to the tilt nut and/or the optional bushing is substantially on axis with the threaded bore;
   e. at least one motor adapted for raising and lowering the column housing, the motor configured to operatively rotate the gear portion of the tilt screw and cause the tilt nut to advance toward the gear portion or withdraw away from the gear portion;
   wherein when the tilt nut advances toward the gear portion or withdraws away from the gear portion, the position of the tilt nut and optional bushing within the column housing causes the column housing to raise or lower relative to the mounting structure, and wherein as a result of the outer surface of the tilt nut body or the optional bushing contacting the surface of the wall opening, the longitudinal axis of the threaded shank portion of the tilt screw is able to pivot fore or aft generally relative to the column housing as the column housing is raised or lowered.

2. The adjustable rake steering column assembly of claim 1, wherein the assembly includes the bushing around at least a portion of the tilt nut, and wherein the tilt nut contacts the bushing and the bushing contacts the surface defining the column housing wall opening.

3. The adjustable rake steering column assembly of claim 1, wherein the steering column mounting structure includes an upper portion adapted to be fixedly secured within an automotive vehicle.

4. The adjustable rake steering column assembly of claim 1, wherein the steering column mounting structure includes an upper portion having a longitudinal axis, and having an opening defined therein through which the tilt screw can be accessed, the longitudinal axis of the tilt screw being non-parallel relative to the longitudinal axis of the upper portion, but being pivotable over a range of about ±10°.

5. The adjustable rake steering column assembly of claim 1, wherein the column housing wall opening is located transversely of the longitudinal axis of the column housing.

6. The adjustable rake steering column assembly of claim 1, wherein the column housing wall opening has a maximum height and a maximum width, the tilt nut has a maximum height and a maximum width, such that (a) at least the maximum width of the column housing wall opening exceeds the maximum width of the tilt nut, (b) the maximum height of the column housing wall opening approximates the maximum height of the tilt nut, or both (a) and (b).

7. The adjustable rake steering column assembly of claim 1, wherein the column housing wall opening and the tilt nut are configured to provide line contact between the body of the tilt nut and the surface of the column housing defining the column housing wall opening, thereby resisting lash in a generally vertical direction while still allowing the column housing to rotate freely among different rake positions throughout a full range of operative movement.

8. The adjustable rake steering column assembly of claim 2, wherein the column housing wall opening and the bushing are configured to provide line or planar contact between the bushing and the surface of the column housing defining the column housing wall opening, thereby resisting lash in a generally vertical direction while still allowing, the column housing to rotate freely among different rake positions throughout a full range of operative movement.

9. The adjustable rake steering column assembly of claim 1, wherein the tilt nut has a generally flat front wall, and generally opposing flat rear wall, a sidewall having rounded portions, which connects the front wall with the rear wall, and a threaded bore having a longitudinal axis that intersects the sidewall and is approximately parallel with the front wall and the rear wall.

10. The adjustable rake steering column assembly of claim 1, wherein the assembly includes a telescoping sub-assembly adapted to selectively advance the inner column tube, steering shaft or both in a fore or aft direction.

11. An adjustable rake steering column assembly, comprising;
   a. a steering column mounting structure;
   b. a column housing adapted to carry an inner column tube having a steering shaft therein, and having a wall with an opening therein, and being fixed in position along its length for affording a generally upward and downward pivotal motion in relation to the mounting structure, the column housing having a longitudinal axis;
   c. an elongated actuatable member having a longitudinal axis and an engagement element;
   d. a position securing member positioned at least partially within the column housing wall opening, the position securing member having a body with an outer surface that is in contact with a surface defining the column housing wall opening, and having a bore therethrough adapted to at least partially surround the elongated actuatable member and selectively engage the elongated actuatable member, the contact arranged between the position securing member and the column housing wall opening such that the load transmitted from the column housing wall opening, to the elongated actuatable member is substantially on axis with the bore;

e. at least one motor adapted for raising and lowering the column housing, the motor coupled to the elongated actuatable member by a drive shaft, and the motor configured to operatively rotate the elongated actuatable member and cause the position securing member to advance upwardly or downwardly along the elongated actuatable member;

wherein when the position securing member advances upwardly or downwardly along the elongated actuatable member, the position of the position securing, member within the column housing causes the column housing to raise or lower relative to the mounting structure, and wherein as a result of the outer surface of the position securing member body contacting the surface of the wall opening, the longitudinal axis of the elongated actuatable member is able to pivot fore or aft generally relative to the column housing as the column housing is raised or lowered.

12. The adjustable rake steering column assembly of claim 11, wherein the steering column mounting structure includes an upper portion having a longitudinal axis, and having an opening defined therein through which the elongated actuatable member can be accessed, the longitudinal axis of the elongated actuatable member being non-parallel relative to the longitudinal axis of the upper portion, but being pivotable over a range of about ±10°.

13. The adjustable rake steering column assembly of claim 11, wherein the column housing wall opening is located transversely of the longitudinal axis of the column housing.

14. The adjustable rake steering column assembly of claim 11, wherein the column housing wall opening has a maximum height and a maximum width, the position securing member has a maximum height and a maximum width, such that (a) at least the maximum width of the column housing wall opening exceeds the maximum width of the position securing member, (b) the maximum height of the column housing wall opening approximates the maximum height of the position securing member, or both (a) and (b).

15. The adjustable rake steering column assembly of claim 11, wherein the column housing wall opening and the position securing member are configured to provide line contact between the body of the position securing member and the surface of the column housing defining the column housing wall opening, thereby resisting lash in a generally vertical direction while still allowing the column housing to rotate freely among different rake positions throughout a full range of operative movement.

16. The adjustable rake steering column assembly of claim 11, wherein the position securing member has a generally flat front wall, and generally opposing flat rear wall, a sidewall having rounded portions, which connects the front wall with the rear wall, and a bore having a longitudinal axis that intersects the sidewall and is approximately parallel with the front wall and the rear all.

17. The adjustable rake steering column assembly of claim 11, wherein the position securing member includes a nut having a generally flat front wall and generally opposing flat rear wall, a plurality of side walls which connect the front wall with the rear wall, a bore having a longitudinal axis that is approximately parallel with the front wall and the rear wall, and a bushing around the nut that is adapted to contact at least a portion of the plurality of side walls of the nut.

18. The adjustable rake steering column assembly of claim 11, wherein the at least one motor has an externally projecting elongated drive shaft that has a longitudinal axis oriented generally parallel with the longitudinal axis of the column housing, and that engages the gear portion of the elongated actuatable member for rotating the elongated actuatable member and causing the position securing member to move along the elongated actuatable member to thereby raise and lower the column housing relative to the mounting structure.

19. The adjustable rake steering column assembly of claim 11, wherein the at least one motor actuates, a gear reduction in a gear box, and wherein the drive shaft transmits torque from the gear reduction to the elongated actuatable member, wherein the drive shaft engages the engagement element of the elongated actuatable member for rotating the elongated actuatable member and causing the position securing member to move along the elongated actuatable member to thereby raise and lower the column housing relative to the mounting structure.

20. The adjustable rake steering column assembly of claim 11, wherein the assembly includes a telescoping subassembly adapted to selectively advance the inner column tube, steering shaft or both in a fore or aft direction.

* * * * *